UNITED STATES PATENT OFFICE.

LAMBERTUS ELFRINK, OF MODJOKERTO, JAVA.

FILLER FOR CAOUTCHOUC AND PROCESS OF MANUFACTURING SAME.

1,062,958.　　　　Specification of Letters Patent.　　Patented May 27, 1913.

No Drawing.　　Application filed January 29, 1913. Serial No. 745,049.

*To all whom it may concern:*

Be it known that I, LAMBERTUS ELFRINK, a citizen of the Netherlands, residing at Modjokerto, Surabaya, Java, have invented certain new and useful Improvements in Fillers for Caoutchouc and Processes for Manufacturing Same, of which the following is a specification.

This invention relates to a filler for caoutchouc which can easily be mixed with the caoutchouc in arbitrary proportions without injuring its property of being adapted to be vulcanized and which is insoluble in water and a plurality of other solvents and hardly attacked by acids and alkalis; and further relates to the composition of caoutchouc with the filler.

The new filler is manufactured from aquatic animals especially fishes of every kind by removing the components soluble in water, drying the solid residue and comminuting it to a fine powder.

In carrying out the invention the fishes for instance cod or haddock are boiled from 2 to 2½ hours in water of 100 degrees centigrade under continual stirring. Thereafter the liquid containing the soluble albumin and other soluble substances is drained off and a solid residue is obtained containing insoluble albumin and other insoluble matter. This insoluble residue is then communicated and preferably treated with preserving agents such a corrosive sublimate, phenol, etc. Then the mass is slowly dried at a temperature of 30 to 35 degrees centigrade and pulverized to as fine a powder as possible.

What I claim is:—

1. In a caoutchouc composition a filler comprising the finely divided insoluble components of aquatic animals.

2. In a caoutchouc composition a filler comprising the dry insoluble powder of the flesh of aquatic animals.

3. In a caoutchouc composition a filler comprising the dry insoluble powder of the flesh of fishes.

4. A composition of matter comprising caoutchouc mixed with the powdered insoluble parts of aquatic animals.

5. A composition of matter comprising caoutchouc mixed with the powdered insoluble flesh of fishes.

In testimony whereof I affix my signature in presence of two witnesses.

L. ELFRINK.

Witnesses:
　A. NORTUIL,
　J. WIRLCHEY.

---

Copies of this patent may be obtained for five cents each, by addressing the "Commissioner of Patents, Washington, D. C."